July 10, 1956 G. J. DI MATTEO 2,754,366

COMMUNICATION SWITCHING ARRANGEMENTS

Filed June 26, 1952 2 Sheets-Sheet 1

INVENTOR

GEORGE J. DI MATTEO

BY William H. Pavitt, Jr.

ATTORNEY

July 10, 1956 G. J. DI MATTEO 2,754,366

COMMUNICATION SWITCHING ARRANGEMENTS

Filed June 26, 1952 2 Sheets-Sheet 2

INVENTOR

GEORGE J. DI MATTEO

BY William H. Pavitt Jr.

ATTORNEY 2,754,366

COMMUNICATION SWITCHING ARRANGEMENTS

George J. Di Matteo, St. Petersburg, Fla.

Application June 26, 1952, Serial No. 295,632
7 Claims. (Cl. 179—2)

This invention relates to communication switching arrangements and has particular application in despatching stations for mobile units where the directions for despatching are received in the station over land telephone lines, and such directions are communicated by an operator in the station to the mobile unit by radio.

However, my invention may also be employed between any two electronic communication systems, between any two land line systems and between any land line and any electronic system.

My invention has as an object to provide a means for a communications operator to effect switching of the operator's headset microphone from one communications system, such as a telephone land line to the transmitting device of a second communications system while simultaneously holding open the connections with the first system.

It is also an object of my invention to permit avoidance of any connection between the first and second system, as for example where the first system is a land telephone system to which subscribers may be prohibited by tariff from making any foreign connections.

It is also an object to permit keying to be accomplished wholly by foot or knee action thereby freeing the operator's hands for writing or other functions.

It is also an object to provide means for more than one operator to work together to pass intelligence between the two systems without both transmitting over the second system at the same time in interference with each other.

It is a further object to provide means for increasing the efficiency of operators passing intelligence between two separate communications systems.

The foregoing and other objects I accomplish in my preferred embodiment by a circuit and gang switching arrangement, said arrangement being activated by solenoids energized simultaneously by the closing of a foot key, and by providing a load resistor across the transmitting connections of the first system to prevent interruption of the connection with the first system until all desired intelligence is passed from one system to the other by the operator. Where more than one operator is installed to pass intelligence between the two systems, I have provided warning circuits to indicate to one operator when the transmitter of the second system is being used by the other operator, and also a locking out arrangement to block usage of the last said transmitter by the first operator in disregard of the warning.

Figure 1:
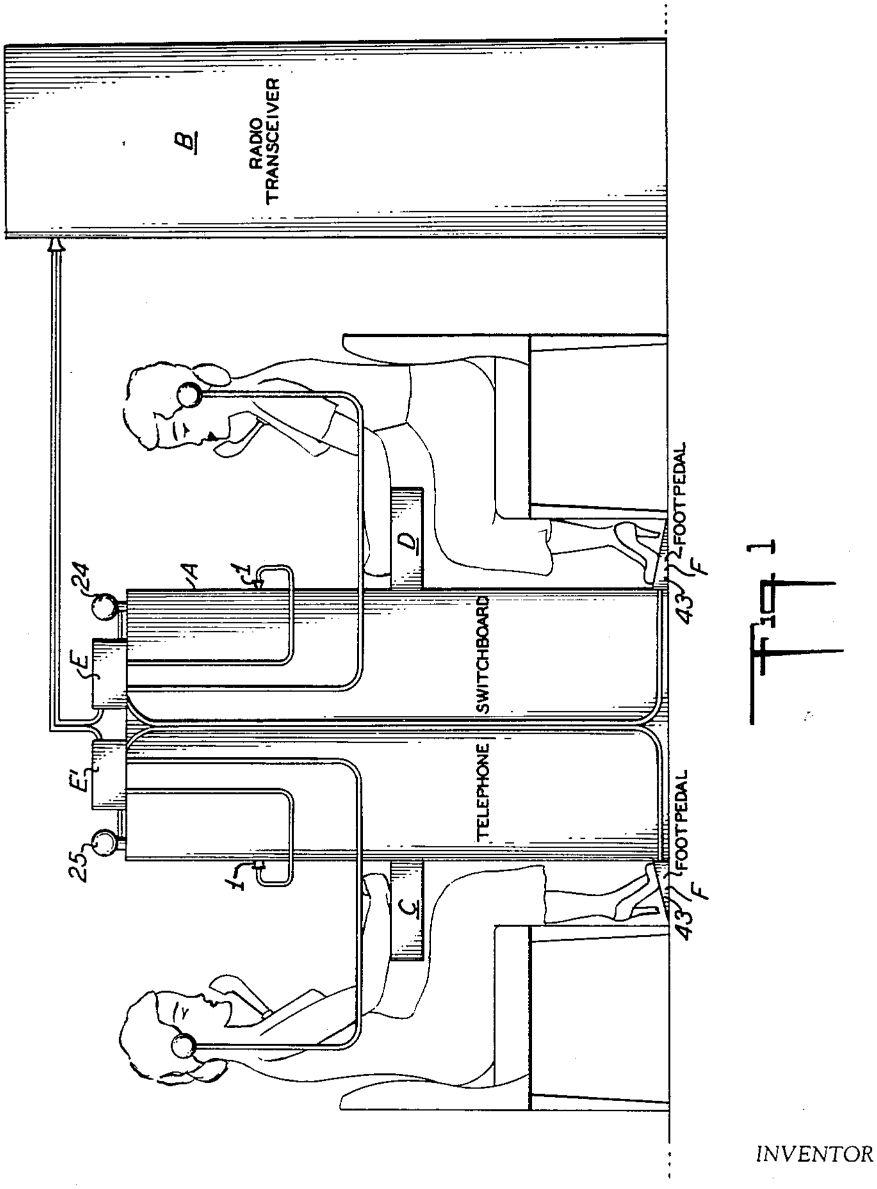
Figure 2:
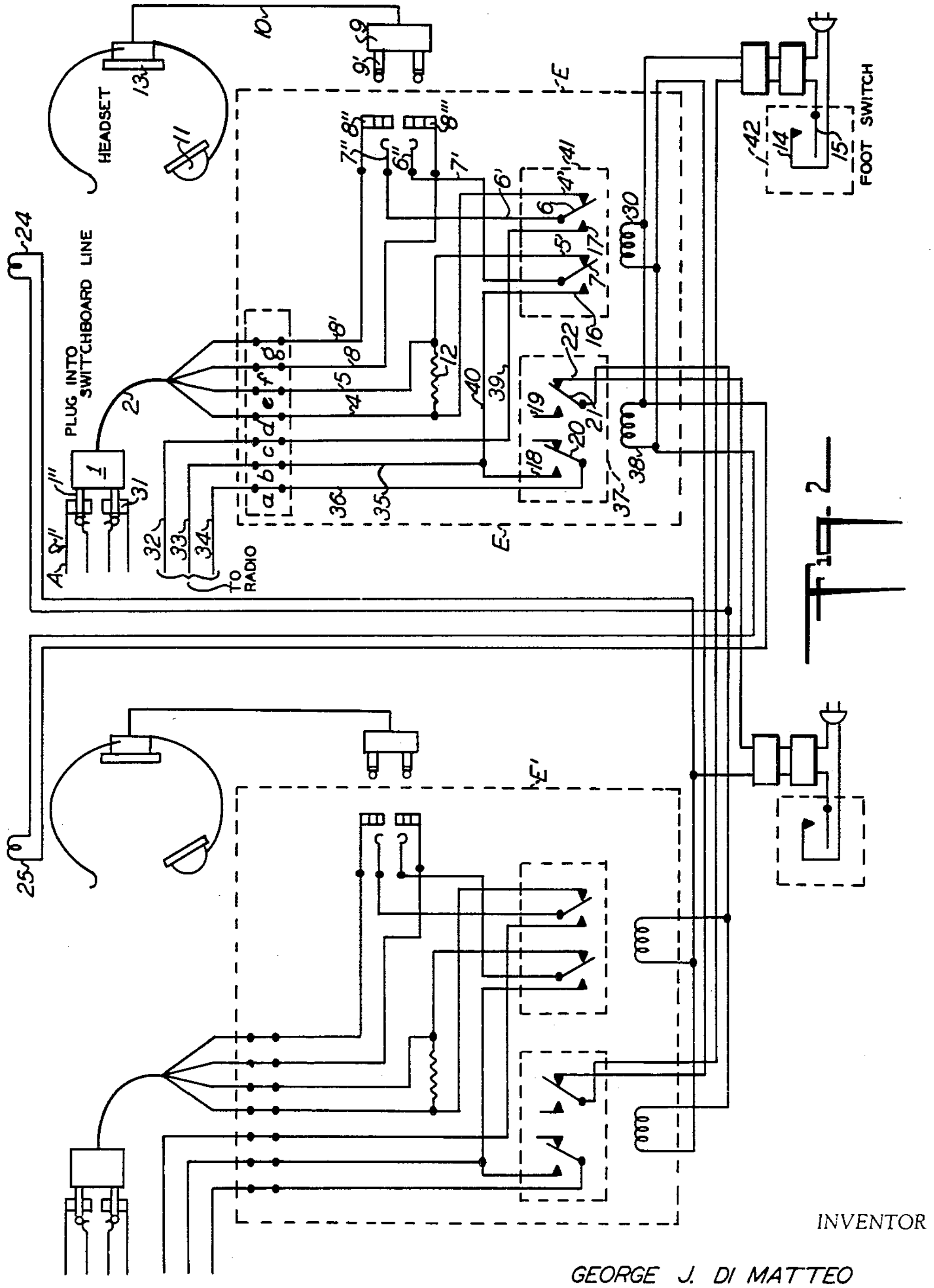

The preferred embodiment of my invention is in the description which follows and in the accompanying drawings in which:

Fig. 1 is a side view of a possible dual operator despatching station arrangement in which my invention is employed, and Fig. 2 is a circuit diagram of the application in such station of my invention interposed between a conventional telephone land line system and a radio system.

Referring to Fig. 1, the object designated by the letter A represents a conventional public branch exchange switchboard into which calls come from telephone land line subscribers, and B, a combination radio transmitter-receiver unit (frequently referred to in the radio art as a transceiver). In the embodiment of my invention, illustrated in Fig. 1, the switchboard A provides two operating positions C and D. It should be clearly understood, however, that certain important features of my invention have useful application where only a single operating position is provided, as will hereafter appear. The operators at positions C and D are charged with answering the telephone system calls received via A, noting the message or other intelligence on a log, holding the telephone call while simultaneously initiating contact with a third party disposed remotely from the operator, via the radio transceiver B in the second communication system. The latter is maintained on a frequency to which other receivers or transceivers in the system are tuned to pick up instructions or other intelligence from the operators in the Fig. 1 despatching station. After thus contacting the third party on the second communications system, the operator may then switch her headset microphone back into the held land line circuit and advise the initial caller of the disposition of his message or intelligence.

For the most efficient performance of their functions in such an arrangement, it is desirable for the operator to limit the use of her hands to plugging in her headset to a calling telephone land line circuit and to writing notes in the station log. To permit such limited use of the operator's hands, I have devised my novel unit E which can be placed on top of the switchboard A and the circuit of which is diagrammed in detail in Fig. 2; and I have also provided in connection therewith a foot key F for each operator in this duplex position station. Where two operating positions are provided at the switchboard, it is desirable to use two of my units E and E′ connected together in the manner hereinafter described to prevent the operators from interfering with each other.

Turning then to Fig. 2, the numeral 1 represents the standard headset plug, as found on a type 52A Western Electric headset, which plugs into a standard headset jack 1′ found on the standard switchboard A. This plug arrangement allows a temporary connection to the switchboard jack 1′ so as not to violate any switchboard owner/controller franchise agreement which may prohibit permanent connection thereto. Plug 1 then connects to a terminal connection board 3 for the unit E. The board 3 may be a standard Jones Strip. This strip, in turn, is connected by wiring within the unit to its various functional parts.

Schematically following through the wiring in the unit, it will be noted that the microphone wiring from the switchboard A feeds into the tips of plug 1 through the jack 1′. Here it is connected through wiring in the flexible cable 2, to terminals *d* and *e* of the terminal board 3. Wiring 4 and 5 respectively then carries the microphone circuit to stator contacts 4′ and 5′ of switch 41. The rotors 6 and 7 are normally closed against stators 4′ and 5′ respectively. Wires 6′ and 7′ connect the rotor arms 6 and 7 to the tip contacts 6″, 7″ respectively, of plug 9. The latter is similar to plug 1. Further wiring (not shown) extending from the tip connection of plug 9 through cord 10 completes the circuit to operator's headset microphone 11. To prevent an automatic disconnect at the telephone switchboard A when relay coil 30 is activated, as hereinafter described, I provide a resistor 12, which, for a conventional land line telephone circuit may be of a value of 100 ohms-one-half watt. This resistor 12 is connected across relay 30 stator contacts 4′ and 5′ to put a pure resistive load across the switchboard microphone lines at all times so long as plug 1 is inserted in the switchboard jack 1′.

Headset receiver intelligence is picked up from the switchboard jack 31 sleeve connections and fed through the standard headset plug 1 sleeves 1'', through wiring in cable 2 to terminals *f* and *g* of the terminal board 3. From *f* and *g*, the receiver intelligence is fed through wiring 8, 8' to the standard telephone jack sleeve connections 8'', 8'''. When the plug 9 is inserted in the jack, contact is made between the sleeve connections 8'', 8''' and the plug sleeves 9'. The latter are further connected via wiring (not shown) extending through the cord 10 to headset receiver 13. This receiver connection is constantly maintained to the switchboard as long as the plug 1 is in the jack 1'. Reception from the transceiver is constantly maintained through the use of a separate, permanently installed loudspeaker (not shown) in the proximity of the operator. The headset leads could be permanently connected to the wires 6', 7', 8 and 8' and the jack with connections 6'', 7'', 8'' and 8''' and the plug 9, 9' eliminated altogether. However, by employing the plug-jack arrangement, which I have illustrated and described, any standard headset may be used with my unit and may further be used back in a standard switchboard if it should become desirable to confine the operator's function at any time to switchboard operation. It is obvious to one skilled in the art that this headset receiver may be similarly arranged to be shifted from one system to the other by providing a loading device similar to resistor 12 across *f* and *g* and interposing a switching device similar to what I have provided to shift my operator's microphone from one system to the other.

The transmitting unit of the transceiver is connected to my novel unit E by means of standard plug (not shown) which, when inserted into its companion jack in the transceiver, places the transmitter in "on-the-air" condition. This plug brings out from the transmitter portion of the transceiver the three standard leads, namely, mike 32, common 33, and push-to-talk 34, which are brought in, respectively, to terminals *c*, *b* and *a* on the terminal board 3. Within the unit E, wiring 35 brings the common lead 33 to one contact 18 of the double-throw switch 37, and wiring 36 connects the push-to-talk lead 34 with the switch arm 20. This switch 37 is normally open as respects contact 18 and is actuated electromagnetically by the energization of coil 38. The "mike" lead 32 is brought via wiring 39 to contact 17 of the double pole-double throw switch 41. The common lead 33 is also connected via wires 35 and 40 with contact 16 of switch 41. This switch is actuated electromagnetically by the energization of coil 30.

Coils 30 and 38 are connected in parallel and both are energized by connections through a key 42 to any available source of electricity, such as a 110 volt power line. The key 42 itself I preferably design to be closed by the operator's foot or knee. By so providing, both of operator's hands may be kept free for writing or other functions. However, the key could be designed to close in response to pressure which the operator might exert by her left hand, elbow, wrist, or other body member which would still permit her writing hand to be kept free for that purpose.

While I have shown two coils 30, 38 to actuate the switch gang 37, 41, obviously a single coil of sufficient strength could be provided to actuate both pairs of switches.

Where a second operator is to be accommodated, as shown in Fig. 1, a duplicate unit E' is provided and connected similarly into both the switchboard and the transceiver. However, in such instance it becomes desirable to provide means for preventing one operator from interfering with the other. This I accomplish by incorporating into my novel circuit arrangement warning pilot lights 24 and 25, and by providing lock-out circuits which prevent one operator from transmitting when the other's foot switch is closed to transmit. Thus, light 25 is connected in parallel with the solenoid coils 30 and 38 in the unit E for the operating position D and light 24 is similarly connected in the unit E' for operating position C.

To effect lock-out of the other operator, one of the D operator's foot switch power lines is run through the contact 22 and arm 21 of the switch 37; and similarly one of the C operator's foot switch power lines is run through corresponding contacts in the switch 37 of the D operator's unit.

My circuit arrangement above described functions as follows: When operator D wishes to transmit over the transceiver, she depresses foot key 42. Depression of this lever 43 brings together contact terminals 14 and 15, thus completing the 110 volt circuit to relay coils 30 and 38. Activation of coil 38 causes relay rotor arm 20 to contact with stator 18. This has the effect of pushing a push-to-talk switch button on the conventional microphone. Simultaneously, rotor arm 21 will disconnect with stator 22 of relay 38 and prevent operator C from actuating her relays should she depress her foot key.

Also, upon depression of foot key 42, voltage impressed on relay 38 coil is likewise impressed on pilot light 25 to warn operator C that operator D is transmitting. Should this warning light go unheeded, operator C will find that she cannot, by depressing the lever on her foot key, activate her transmitting circuit because D's energization of relay coil 38 will disconnect rotor arm 21 from stator 22. This lockout switch prevents any possibility of voltage impression on relay coils 38 and 30 of unit C, thereby eliminating the possibility of the operator C talking simultaneously on the transmitter with operator D.

In addition, the depression of foot key 42, in energizing relay coil 30 releases rotor arm 7 from stator 5' and connects it to stator 16; likewise, rotor arm 6 is released from stator 4', and connected to stator 17. The switching of rotor 7 to stator 16, and rotor 6, to stator 17 connects microphone 11 through wiring in cord 10, plug 9, telephone jack 6'', 7'', wiring 6', 7' and wiring 35, 40 and 39 to terminals *b* and *c* of the terminal board 3, and thence, to the standard three-way microphone plug "mike" and "com" pins 32, 33. This connection of the operator's microphone will allow the intelligence of operator D to be transmitted therethrough. With the simultaneous release of connections between rotors 6 and 7 and stators 4 and 5 respectively, the resistor 12 loads the switchboard "mike" connections 1', thus holding the commercial telephone circuit active while the operator talks to the listener on the receiving end of the transceiver system. At such times, the person on the receiving end of the commercial telephone line will, while still being connected to the switchboard, be unable to hear the operator's transmission to the transceiver's receiving party; nor will he be able to converse directly with the transceiver's receiving party.

When operator D has completed her transmission over the second system she removes her foot pressure on lever 43' and the solenoids 30, 38 deenergize, thereby permitting the arms 6, 7, 20 and 21 to switch back to their original positions. Operator C may now transmit by depressing her lever 43 in the foot key 42. Unit E' functions in the same manner as unit E.

My invention as hereinabove described has been found particularly useful in stations for despatching mobile units such as police cars or taxicabs. However, it has many other applications which will readily occur to one skilled in the art.

While I have illustrated and discussed my invention, as applied to effect a transfer of intelligence from a commercial land line telephone system to a radio system, it will readily occur to one skilled in the art from a study of the foregoing that my invention may be utilized in application involving any two communications systems, and I intend that the same shall be comprehended within the scope of my invention.

I claim:

1. A switching arrangement for use between a radio communication system and a conventional land line system, the last said system having switchboard means adapted to receive a jack plug for an operator's microphone and earphones to connect into the said land line system, both systems having means to deliver intelligence to a single station and transmitting means whereby intelligence from an operator in said station may be delivered into each said system, said operator having a single microphone for use in both systems, and means for receiving intelligence from both said systems, said combination including a switching arrangement, said arrangement comprising at least two double position switches, said switches having armatures movable between alternative stator positions and normally resting in one of said positions, said armatures being actuatable by electromagnetic means simultaneously to effect a shift of each said armature from one position to the other, a source of current connectable to energize said electromagnetic means, said switches being wired to connect the operator's microphone to the armatures of said switches, and to connect the alternative stator positions on each of said two switches to the transmitting means of each of said systems, and a key adapted to close the connection of said current source with said electromagnetic means, and thereby to actuate said electromagnetic means to effect a shift of the armatures, and hence to disconnect the operator's microphone from one system and to connect it into the second system, said arrangement having a jack plug, said jack plug being adapted to be plugged temporarily into said switchboard means.

2. The switching arrangement as described in claim 1, wherein one of the communication systems is a telephone land line to which the operator's microphone is connected through the switches in their position when the electromagnetic means are not energized, and a load resistor is connected between leads to the transmitting means of said land line system to hold the land line circuit when the electromagnetic means are energized and connection of the operator's microphone is shifted into the other communications system.

3. The arrangement as described in claim 2 wherein the land line is brought into the station through a conventional switchboard, and the connections to the land line from the receiving means and from the switch positions are brought through a standard telephone jack plug for temporary insertion in said switchboard.

4. The arrangement as described in claim 2 wherein the transmitting means of the other communication system includes common and push-to-talk leads and said arrangement contains a further switch and electromagnetic means connected to said keyed power source, whereby said further switch may be simultaneously closed when the operator's microphone is shifted from the land line to the other communications system.

5. The arrangement as described in claim 2 wherein the key is a foot operated lever device whereby the operator's hands may be kept free for writing and making connections with the telephone land line.

6. In a station having receiving and transmitting means in each of two separate communications systems, and at least two operators positions in said station, each operator's position having a single microphone connectable into the transmitting means for both said systems, an arrangement whereby each operator may switch his microphone from the transmitting means of one system to that of the other, said arrangement comprising for each operator at least two double position switches, said switches having armatures moving between alternative stator positions and normally resting in one said position, said armatures being actuated by electromagnetic means simultaneously to effect a shift of said armatures from one position to the other, a source of current connectable to energize said electromagnetic means to effect said shifting of armatures, said switches being wired to connect the operator's microphone to the armatures of said switches, and to connect the alternative stator positions on each of said two switches to the transmitting means of each of said systems, a lockout switch interposed between the power source and the electromagnetic means of the other operator's arrangement, said lockout switch, when opened, breaking the connection between said source and said other operator's electromagnetic means, and said lockout switch being responsive to energization of said electromagnetic means, and a key adapted to close the connection of said current source with said electromagnetic means, thereby to actuate said means to effect a shift of the armatures, and hence to disconnect the operator's microphone from one system and to connect it into the second system while simultaneously preventing the other operator from switching his microphone into the second system.

7. The arrangement as described in claim 6 wherein there is further provided for each operator a warning light, said light being connected across the keyed current source of the arrangement of the other operational position whereby, when the key of the latter is closed, the operator in the lighted position is warned that the transmitter of the second system is in use.

References Cited in the file of this patent

UNITED STATES PATENTS

| | | |
|---|---|---|
| 1,484,973 | Stevenson | Feb. 26, 1924 |
| 1,487,309 | Booth | Mar. 18, 1924 |
| 1,783,310 | Saunders et al. | Dec. 2, 1930 |
| 2,541,336 | Carroll | Feb. 13, 1951 |